United States Patent [19]

Ford

[11] Patent Number: 5,415,026
[45] Date of Patent: May 16, 1995

[54] VIBRATION WARNING DEVICE INCLUDING MERCURY WETTED REED GAUGE SWITCHES

[76] Inventor: David Ford, 201 Westminster Ct., Madison, Wis. 53714

[21] Appl. No.: 195,480

[22] Filed: Feb. 14, 1994

Related U.S. Application Data

[63] Continuation-in-part of Ser. No. 51,602, Apr. 23, 1993, abandoned, which is a continuation-in-part of Ser. No. 842,477, Feb. 27, 1992, abandoned.

[51] Int. Cl.[6] .......................................... G01N 21/00
[52] U.S. Cl. .................................. 73/651; 73/660; 73/661
[58] Field of Search ............... 73/660, 661, 651; 340/680, 682, 683; 200/61.45 R, 61.51, 61.62, 61.47, 61.48

[56] References Cited

U.S. PATENT DOCUMENTS

| | | | |
|---|---|---|---|
| 2,303,474 | 12/1942 | Kalb | 335/56 |
| 2,622,163 | 12/1952 | Snell | 200/61.49 |
| 4,329,670 | 5/1982 | Bollen et al. | 335/56 |
| 4,455,461 | 6/1984 | Maguire | 200/61.45 R |
| 4,910,502 | 3/1990 | Serveau et al. | 340/683 |
| 5,001,933 | 3/1991 | Brand | 73/651 |
| 5,021,618 | 6/1991 | Ubukata et al. | 200/61.47 |

*Primary Examiner*—Hezron E. Williams
*Assistant Examiner*—Nashmiya Ashraf

[57] ABSTRACT

An improved vibration warning device is disclosed for monitoring rotating machinery, and signaling the occurrence of an unsafe condition. The apparatus includes a one or more mercury wetted resonating reed gauge switches tuned to a critical frequency that lies within a predetermined range of the critical frequency of the rotor. An imbalance force imposed by the rotor is transmitted to the device and if the imbalance force exceeds a predetermined threshold, the mercury wetted reed gauge switch/switches will conduct an appropriate electrical warning signal.

3 Claims, 2 Drawing Sheets

80° contact closed dwell time typical at 250 Hz.

VIBRATION WARNING DEVICE INCLUDING MERCURY WETTED REED GAUGE SWITCHES

REFERENCES TO RELATED APPLICATIONS

This is a continuation-in-part of U.S. patent application Ser. No. 08/051,602, filed Apr. 23, 1993, now abandoned, which is a continuation-in-part of U.S. patent application Ser. No. 07/842,477, filed Feb. 27, 1992, also now abandoned.

BACKGROUND OF INVENTION

1. Field of Invention

The present invention relates to a new and improved device for detecting the unbalance in rotating machines, especially in aircraft jet engines, from a threshold considered to be detrimental to the safety of personnel or to the length of life of the machine.

2. Brief Description of Prior Art

Kalb U.S. Pat. No. 2,303,474 discloses a mercury switch device "having an electromagnetic armature operable in a reciprocating movement".

Beckman U.S. Pat. No. 3,034,043 discloses an frequency selective device driven by a piezoelectric transducer and protected by a shock responsive switch which utilizes a "bead or drop of cohesive or elastic electrically conductive material such as mercury".

Green U.S. Pat. No. 3,973,095 discloses a resonating mercury switch, set at the 9000 Hz. frequency of braking glass "to resonate, causing the mercury to overcome the slight flow resistance due to contact with the electrode, the platinum spike, and the glass, and migrate toward the electrode".

Bollen U.S. Pat. No. 4,329,670 discloses an "mercury switch operating in the so-called Form C mode".

Powell U.S. Pat. No. 4,279,159 discloses a vibration monitoring device that utilizes a piezoelectric accelerometer.

Sakurada U.S. Pat. No. 4,441,370 discloses an improvement in the manufacturing of cantilever type vibration sensors by substantially eliminating the disadvantages and inconveniences inherent in prior art.

Maguire U.S. Pat. No. 4,455,461 discloses a imbalance detector that utilizes a pendulum arm that is tuned to a critical frequency.

Anderson U.S. Pat. No. 4,463,610 & 4,479,389 discloses a vibration detector that utilizes a magnetostrictive element and a detecting means.

Wilder U.S. Pat. No. 4,665,393 discloses a vibration monitoring system that utilizes a probe element in spaced relation to the shaft for contact therewith upon occurrence of excessive vibration.

Miyamoto U.S. Pat. No. 4,751,848 discloses a vibration sensor that utilizes an electrically conductive elastic material with its conductivity variable according to a strain thereof produced by the resonant vibration.

Serveau U.S. Pat. No. 4,910,502 discloses a device for detecting unbalance by a pendulum formed from a vertical rod made of an elastically deformable metal.

Brand U.S. Pat. No. 5,001,933 discloses a micromechanical vibration sensor utilizing a conductive cantilevered beam and an integrated circuit and microchip.

Ubukata U.S. Pat. No. 5,021,618 discloses a acceleration responsive switch that utilizes an electrically conductive liquid such as mercury and a pair of electrodes which are brought in contact with the conductive liquid when a shock acting on the receptacle causes the conductive liquid to move.

SUMMARY OF INVENTION

The principal objective of the invention is to provide a new and improved device for use in monitoring vibration levels of rotating machinery.

It also an objective of the present invention to provide such a device which is of simple and inexpensive construction.

Another objective is to provide a device that is less prone to failure then the complex and expensive piezoelectric monitoring devices now in use.

The above stated objects and other objects of this invention are accomplished by an improved vibration monitoring device. The device includes a stud mounted sensor of improved design which is mounted at the bearing journal of a rotating machine with the vertical axis of the device perpendicular to the axis of rotation of the rotating mass. Upon occurrence of excessive vibration the sensor will electrically activate a warning light.

DETAILED DESCRIPTION OF THE PREFERRED EMBODIMENT

The following is a description of the resonating mercury wetted reed gauge switch used as a vibration warning device.

Figure 1:
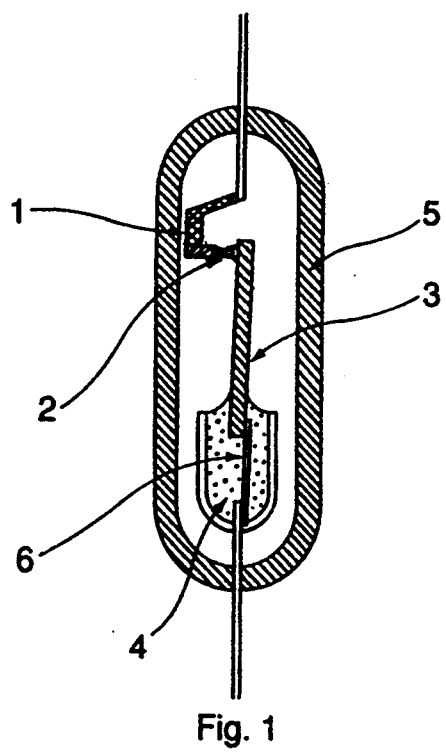
FIG. 1 is a detailed cross-sectional view of the resonating mercury wetted reed gauge switch.

Referring to FIG. 1, reference 1 is the stationary contact of the reed gauge. Reference 3 is the mercury wetted cantilever that resonates at a frequency controlled by its mass, length and spring constant.

$$\omega = \sqrt{\frac{k}{ML^3}}$$

ω=forcing-frequency-angular
k=linear-stiffness-of-spring
L=length-of-cantilever-inch
M=Mass-of-cantilever-grams Reference 6 is the spring for the cantilever. The spring is selected for a linear stiffness that responds to the desired frequency. The spring-cantilever configuration allows the reed gauge to operate as a "massless beam with concentrated mass loads". The gap between 1 & 3 is set to electrically close the reed gauge switch at a desired acceleration level. When the switch closes and then starts to open, a viscous bridge of mercury forms reference 2. This produces a reed gauge switch with a long closed dwell time of up to 80 degrees, FIG. 5. The mercury also acts as a shock absorber that protects the electrical contacts, reference 1 and 3, and produces a switch with very low impedance and contact resistance.

A glass tubular envelope reference 5 is sealed around the two electrical leads shown in FIG. 1. and encloses the resonating mercury wetted reed gauge. A fork shaped-reservoir, built in to the resonating mercury wetted reed gauge forms two pockets that are filled with mercury, reference 4. These pockets act as a damper and a reservoir. The damper attenuates the resonator and prevents it from reacting to any noise, or harmonics of the fundamental vibration. (The filtering of unwanted harmonics by the use of viscous dampening is explained by R. C. Hibbeler in Engineering Mechanics Statics and Dynamics, (Macmillan) Sec. 22.5. Viscous Damped Forced Vibration: "Only the particular solution, which describes the steady-state vibration of the system, will remain. Since the applied forcing function is harmonic, the steady-state motion will also be harmonic". The use of TUNED DAMPERS utilizing viscous and hysteric materials is also explained by Cyril M Harris in SHOCK & VIBRATION, (McGraw Hill) p.p. 2-2 through 2-16, and 37-3 through 37-9).

The reservoir supplies mercury along small grooves cut into the cantilever by capillary action, this replaces material used during operation. Mercury used in the gap during operation 2 is drawn back into the reservoir 4 by cohesion.

Figure 2:
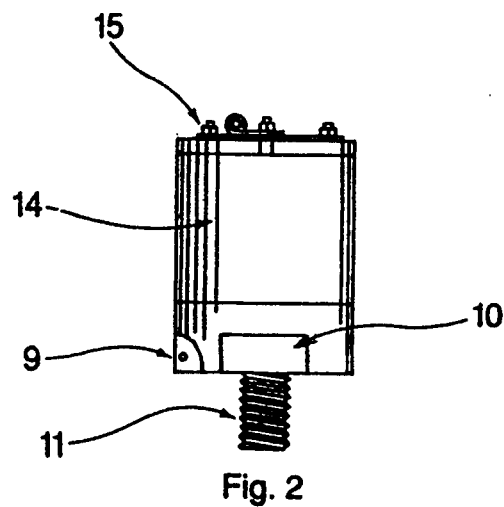
FIGS. 2 & 2a are front and top views of the resonating mercury wetted reed gauge switch stud mounted sensor container.
Figure 2A:
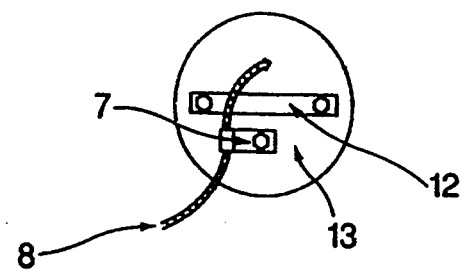

Referring to FIGS. 2 and 2a.

The resonating mercury wetted reed gauges are mounted in a container that forms a suitable vibration sensor, reference FIGS. 2 and 2a. The mounting base of the sensor Reference 10 and 11 are of suitable metal and include a stud for mounting, two wrenching flats and 9 a safety lock wire hole. Reference 13 is the top of the sensor made of suitable metal, 12 is a thin strip of suitable metal for a locking tab that is formed around the nuts 15 to prevent loosening from vibrations. Reference 8 is the electrical wire lead for the warning circuit, 7 is a strain relief clamp. A suitable metal tubing 14 forms the housing container and encloses the vibration sensor device.

Figures 3, 3A:
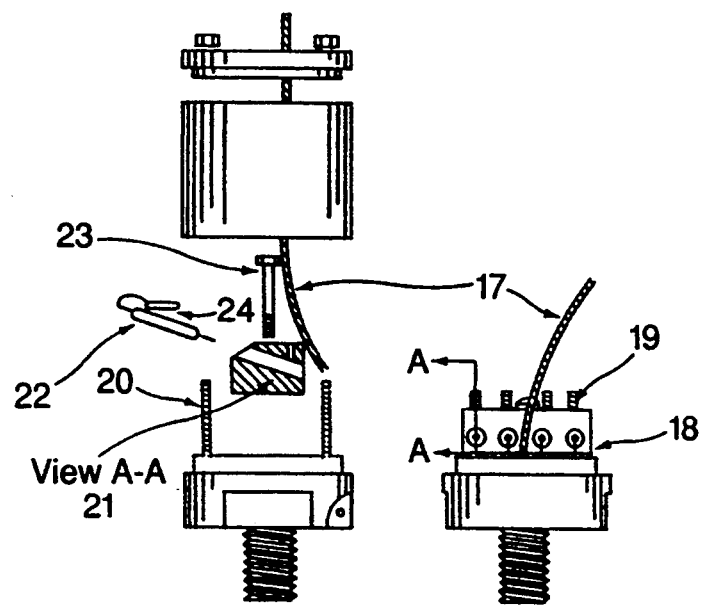
FIGS. 3 & 3a are a exploded front, and profile views of four resonating mercury wetted reed gauge switches installed in the container shown in FIGS. 2 & 2a. Reference 21 is a cross-section of FIG. 3a section A—A.

Referring to FIGS. 3 and 3a.

The following is a description of four resonating mercury wetted reed gauge switches in a stud mounted container. A heat shrink tube insulated rod reference 20 is used to hold the outer container together. A electrical ground reference 24 is connected between the resonating mercury wetted reed switch and the low voltage ground of the warning circuit. A electrical wire reference 17 bus bar 18 connect the reed gauges to the warning circuit, FIG. 4. The reed gauges are held in place b nylon tipped set screw 19. Reference 23 is a suitable screw that connects electrical terminal 24 to electrical ground, and the assembly block 21 to the base 10 shown in FIG. 2. Reference 22 is one of four mercury wetted reed gauge switches, such as shown in FIG. 1. The mercury wetted reed gauge is placed in its hole drilled in the assembly block 21 on a twenty degree angle with the fork and reservoir down view A—A. This twenty degree angle allows gravity to help return the mercury to the reservoir when the machine the sensor is monitoring is not rotating.

Figure 4:
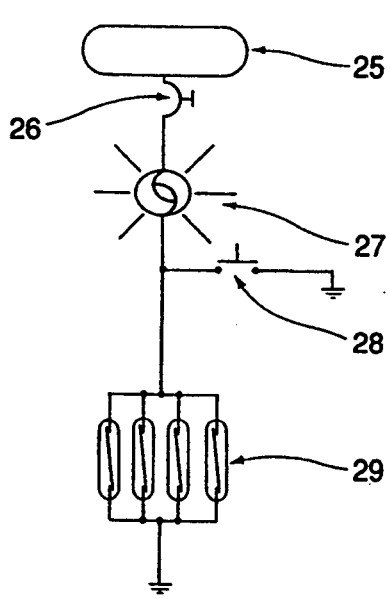
FIG. 4 is a electrical schematic showing the resonating mercury wetted reed gauge switches in a typical warning circuit.

Referring to FIG. 4.

The warning circuit consists of a electrical power bus 25, a circuit protection breaker 26, a warning light 27, a push to test switch 28 provided to test the light bulb 27, and the resonating mercury wetted reed gauges 29.

Figure 5:
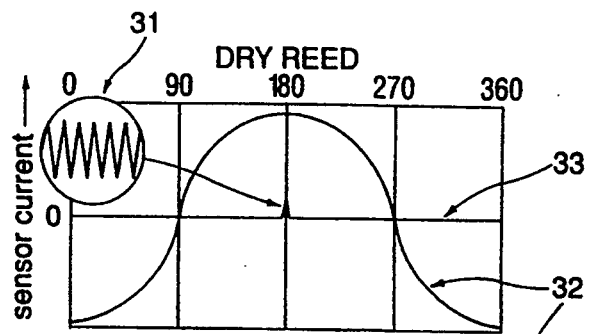
FIGS. 5 & 5a are graphs showing the difference in performance between a dry resonating reed gauge switch and a mercury wetted reed gauge switch.
Figure 5A:
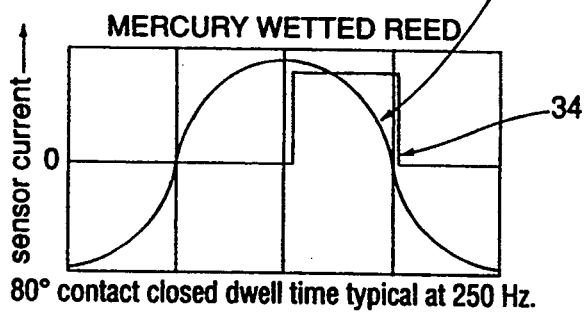

Referring to FIGS. 5 and 5a.

FIG. 5 is a resonating dry reed gauge switch sensor, the electrical output is reference 33. FIG. 5a is a mercury wetted reed gauge switch, the electrical output is reference 34. Reference 32 is the force of the vibration expressed in terms of sinusoidal motion. It should be noted that the dry reed has a very short closed time 33 due to the bounce of the electrical contacts 31. It should be noted that the mercury wetted reed gauge switch is closed during 80 degrees of the vibration cycle. This long closed circuit dwell time is responsible for and directly related to producing a long current flow in the warning circuit and a bright warning light alerting the operator of the vibrating machinery.

Figure 6:
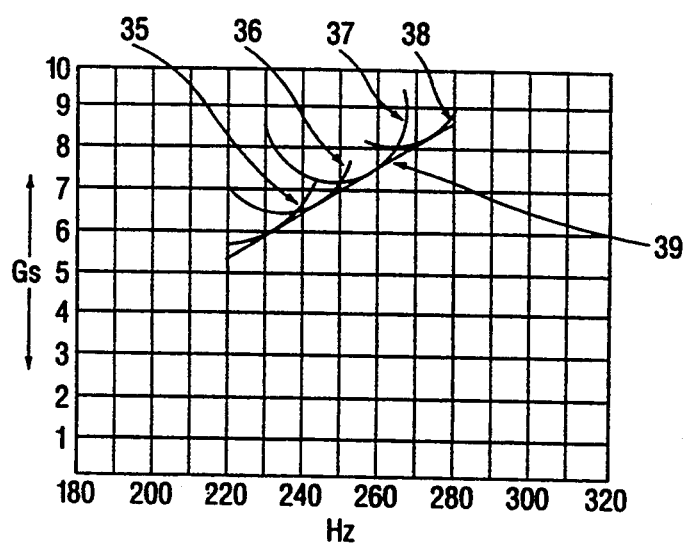
FIG. 6 is a graph showing four resonating mercury wetted reed gauge switches in operation.

Referring to FIG. 6.

The following is a detailed description of four resonating mercury wetted reed gauges in operation. Line 39 is a typical manufacturer's vibration limit. Curves 35, 36, 37 and 38 are the closure curves of four selected resonating mercury wetted reed gauge switches.

I claim:

1. A improved vibration warning device which comprises a mounting base (1), a housing (14), an assembly block (21), for holding one or more mercury wetted reed gauge switches,
   wherein each mercury wetted reed gauge switch comprises
   a sealed tubular envelope (5),
   a mercury wetted cantilever means for resonating at a certain frequency of vibration (3),
   a stationary electrical contact means positioned adjacent one end of said cantilever means to form a gap (2) that can be closed in response to vibration above a certain acceleration level,
   a fork-shaped means for holding a reservoir of mercury (4) that dampens and attenuate the cantilever and supplies mercury to the gap (2) formed between the stationary contact and the cantilever.

2. The device of claim 1 for use on rotating machinery, and further including a bright warning light for indicating vibration above the certain acceleration level.

3. The device of claim 1 adapted to be mounted on bearing journals of rotating machinery and further including a warning light for signalling vibration above the certain acceleration level.

* * * * *